United States Patent [19]
Vali et al.

[11] Patent Number: 5,212,583
[45] Date of Patent: May 18, 1993

[54] ADAPTIVE OPTICS USING THE ELECTROOPTIC EFFECT

[75] Inventors: Victor Vali, Laguna Hills; David B. Chang, Tustin; I-Fu Shih, Los Alamitos; Bruce R. Youmans, Temple City, all of Calif.

[73] Assignee: Hughes Aircraft Company, Los Angeles, Calif.

[21] Appl. No.: 818,315

[22] Filed: Jan. 8, 1992

[51] Int. Cl.$^5$ .......................... G02F 1/03; G02F 1/33
[52] U.S. Cl. .................................. 359/245; 359/254; 359/315; 359/319
[58] Field of Search ............... 359/245, 252, 254, 257, 359/315, 319

[56] References Cited
U.S. PATENT DOCUMENTS

| | | | |
|---|---|---|---|
| 2,467,325 | 4/1949 | Mason | 359/254 |
| 3,614,200 | 10/1971 | Taylor | 359/254 |
| 4,466,703 | 9/1984 | Nishimoto | 359/319 |
| 4,636,039 | 1/1987 | Turner | 359/245 |
| 4,706,094 | 11/1987 | Kubick | 359/315 |
| 5,093,747 | 3/1992 | Dorschner | 359/315 |
| 5,124,835 | 6/1992 | Shibaguchi et al. | 359/319 |

*Primary Examiner*—Bruce Y. Arnold
*Assistant Examiner*—Evelyn A. Lester
*Attorney, Agent, or Firm*—Michael W. Sales; Wanda K. Denson-Low

[57] ABSTRACT

An adaptive electroopical lens system for use in optical data storage systems, optical phased arrays, laser or other optical projectors, and raster scanning devices, and the like. The invention provides an electrooptical means for scanning an optical beam or moving an optical storage or retrieval point. Beam movement is achieved electrooptically, by changing the index of refraction of an electrooptical material by controlling electric fields applied thereto. A plurality of electrodes are disposed on one surface of the electrooptic material and a ground electrode is disposed on the other. The electrodes are adapted to apply electric fields derived from a voltage source to the electroopic material that selectively change its index of refraction and provides for a predetermined index of refraction profile along at least one dimension thereof, thus forming a lens. By appropriately forming the electrode pattern and properly controlling the voltages applied thereto, differing lens shapes may be formed. Since the response times of the electrooptic materials employed in the present invention are on the order of nanoseconds ($10^{-9}$ sec) or less, the intrinsic response frequency of the lens system is $10^9$ Hz or more. The present invention thus increases the data storage and retrieval capacity of optical systems in which it is employed.

17 Claims, 1 Drawing Sheet

ADAPTIVE OPTICS USING THE ELECTROOPTIC EFFECT

BACKGROUND

The present invention relates generally to adaptive optical systems, and more particularly, to an adaptive optical lens system that uses the electrooptic effect.

At present, conventional optical data storage systems use mechanical or acoustical means for moving the optical storage or retrieval point. This is typically achieved by means of a rotating or oscillating mirror that moves a laser beam to read or write data on the storage medium. These approaches are limited to less than 10 KHz reading or writing speeds. Acoustic means for moving the light beam is limited by the speed of sound in solids, typically on the order of 5 km/second.

Such devices as optical memories, laser projectors and raster scanning devices are all implemented using the above-mentioned mechanical or acoustical means. Consequently, there are inherent limitations due to the mechanical or acoustical devices that limit the speed of the systems in which they are used. Simple devices such as galvanometers, and the like, are implemented using rotating mirrors, whose response times are limited by the response time of the rotating mirror assembly.

In some applications, such as optical data storage systems and optical phased arrays, and the like, it is important to move the focal point very rapidly. To increase the reliability of such a system, it is necessary that a nonmechanical or nonacoustical approach be provided.

Accordingly, it would be an improvement in the art to have an electronically adjustable, adaptive, optical lens that does not require mechanical or acoustical means for controlling its focussing ability.

SUMMARY OF THE INVENTION

In accordance with the present invention, an adaptive optical lens system for use in optical data storage systems, optical phased arrays, laser or other optical projectors, and raster scanning devices, and the like, is provided that employs electrooptical means for focussing the system. In the case of optical storage devices, the present invention provides an electrooptical means for moving the optical storage or retrieval point. In the case of laser or other optical projectors, and raster scanning devices, and the like, the present invention provides an electrooptical means for focusing or scanning the image projected thereby. This is achieved electrooptically, by changing the index of refraction of a material that is achieved by controlling electric fields applied to the adaptive optical lens system.

More particularly, the present invention comprises an adaptive optical lens system. The system includes an electrooptic material having first and second surfaces and having an index of refraction that is adjustable is response to an applied electric field. A first plurality of electrodes is disposed on the first surface of the electrooptic material and at least one ground electrode is disposed on the second surface of the electrooptic material. The electrodes are adapted to apply electric fields to the electrooptic material that are adapted to selectively change the index of refraction of the electrooptical material across at least one dimension thereof. This provides for a predetermined index of refraction profile along the at least one dimension and thus forms a lens. The change in index of refraction across the one dimension is adapted to change the angle at which an optical beam entering the electrooptic lens exits the lens. A voltage source is coupled to the first plurality of electrodes and the ground electrode for applying predetermined voltages to the plurality of electrodes to create the index of refraction profile.

The present invention may be considered as a continuous optical phased array or an electrooptically adaptive optical system, depending upon its application. However, unlike a discrete optical phased array, it does not require computation speeds of $10^{15}$ Hz. Since the response times of the electrooptic materials employed in the present invention are on the order of nanoseconds ($10^{-9}$ sec) or less, the intrinsic response frequency of the lens system is $10^9$ Hz or more. The present invention thus increases the data storage and retrieval capacity of optical systems in which it is employed.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
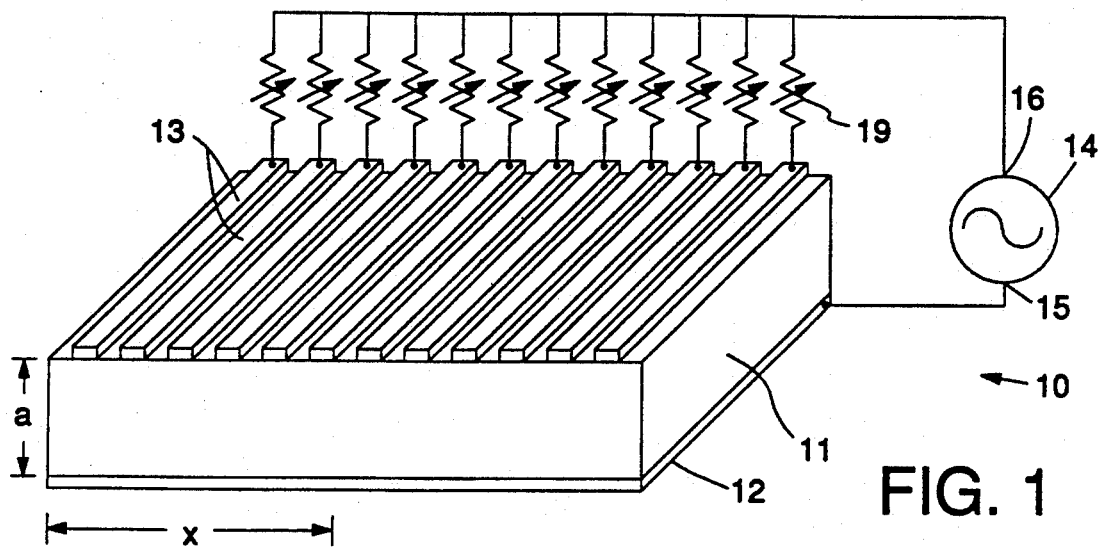
FIG. 1 shows a first embodiment of an electrooptical lens system in accordance with the principles of the present invention.

FIG. 1 shows a first embodiment of an electrooptical lens system 10 in accordance with the principles of the present invention. The electrooptical lens system 10 comprises an electrooptic material 11, such as lithium niobate ($LiNbO_3$) or barium titanate ($BaTiO_3$), for example. A transparent ground electrode 12 is disposed on one surface of the electrooptic material 11. The transparent ground electrode 12 may be made of indium tin oxide, for example. A plurality of spaced apart, parallel, positive electrodes 13 are disposed on a surface of the electrooptic material 11 opposite the ground electrode 11. The plurality of positive electrodes 13 may also be made of indium tin oxide, for example. A voltage source 14 has a negative terminal 15 connected to the ground electrode 11 and has a positive terminal 16 connected to each of the plurality of positive electrodes 13 by way of a variable resistor 19 that permits each electrode 13 to have a different potential.

The first embodiment of the electrooptical lens system 10 operates such that the positive electrodes 13 are individually controlled to provide for shaping of the index of refraction of the electrooptic material 11 along one axis thereof. This provides for the formation of a concave or convex cylindrical lens having varying radii of curvature. The various radii of curvature is controlled by controlling the various voltages applied to individual ones of the plurality of electrodes 13.

In order to better understand the electrooptical lens system 10 of the present invention, the electrooptic effect is defined as the change of the index of refraction ($\Delta n$) of certain materials when they are subjected to an electric field. For some materials, such as lithium niobate ($LiNbO_3$) or barium titanate ($BaTiO_3$), the index of refraction is quite high. The index of refraction is $30\times10^{-10}$ cm/volt and $820\times10^{-10}$ cm/volt, respectively, for the two cited materials. It has been determined experimentally that electric fields of $>500$ kV/centimeter may be used (for $LiNbO_3$) without dielectric breakdown in the material. However, the devices does not require linearity to work. Typically the applied voltage is in the range of from 0 kV/centimeter to 100 kV/centimeter. Therefore index of refraction changes of the order of 0.1 are obtainable.

The focal length change $\Delta f$ of a lens made of an electrooptic material is given by the equation: $\Delta f = f(\Delta n/n - 1)$, and the deflection change $\Delta\theta$ of a beam going through a prism, with the proper angle $\alpha$, is given by the equation: $\Delta\theta \simeq \Delta n \cdot \alpha$. For $\Delta n = 0.1$ and $f = 10$ cm, $n \simeq 2$, and $\Delta f \simeq 1$ cm. Consequently, the deflection angle change $\Delta\theta$ is for angle $\alpha = 30$ degrees is $\Delta\theta = 3$ degrees.

These values are subject to change (increase) depending on the quality of materials available. However, the fact that $\Delta\theta$ is only 3 degrees does not imply that the total deflection angle through an optical system would be limited to that value. An optical system may be designed to magnify the deflection angle significantly.

Figure 2:
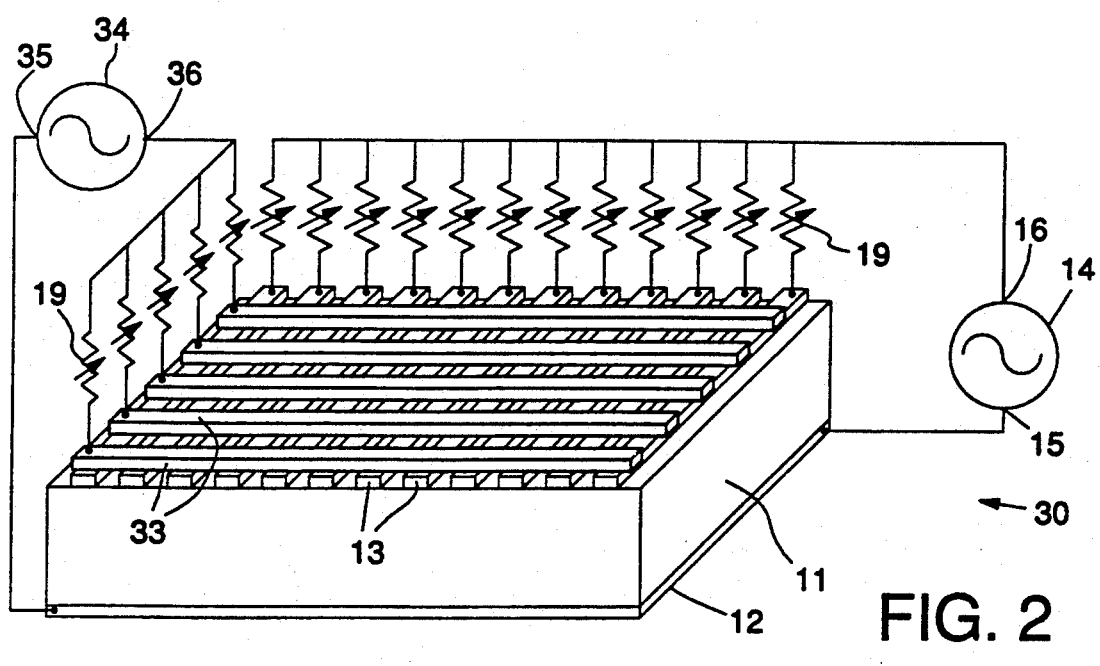
FIG. 2 shows a second embodiment of an electrooptical lens system in accordance with the principles of the present invention.

FIG. 2 shows a second embodiment of an electrooptical lens system 30 in accordance with the principles of the present invention. The electrooptical lens system 30 comprises the electrooptic material 11, which may comprise lithium niobate ($LiNbO_3$) or barium titanate ($BaTiO_3$), for example. The transparent ground electrode 12 is disposed on one surface of the electrooptic material 11. The plurality of spaced apart, parallel, positive electrodes 13 are disposed on a surface of the electrooptic material 11 opposite the ground electrode 11. A second plurality of spaced apart, parallel, positive electrodes 33 are disposed on top of the first plurality of positive electrodes 13 opposite the ground electrode 11. The second plurality of positive electrodes 33 are oriented orthogonal to the plurality of positive electrodes 13. The voltage source 14 has its negative terminal 15 connected to the ground electrode 11 and has its positive terminal 16 connected to each of the plurality of positive electrodes 13 by way of the variable resistor 19 that permits each electrode 13 to have a different potential. A second voltage source 34 has a negative terminal 35 connected to the ground electrode 11 and has a positive terminal 36 connected to each of the second plurality of positive electrodes 33 by way of similar variable resistors 19.

The second embodiment of the electrooptical lens system 30 operates in a manner similar to the first embodiment, except that the two sets of positive electrodes 13, 33 are individually controlled to provide for shaping of the index of refraction of the electrooptic material 11 along two orthogonal axes thereof. This provides for the formation of a convex or concave spherical lens having varying radii of curvature.

Thus there has been described a new and improved an adaptive optical system that is implemented using the electrooptic effect. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An adaptive optical lens system comprising:

an electrooptic material having first and second surfaces that are disposed normal to the direction of propagation of an optical beam through the adaptive optical lens system and having an index of refraction that is adjustable in response to an applied electric field;

a first plurality of electrodes disposed on the first surface of the electrooptic material and at least one ground electrode disposed on the second surface of the electrooptic material that are adapted to apply electric fields thereto, which first plurality of electrodes and at least one ground electrode are substantially transparent to the optical beam, which electric fields are adapted to selectively change the index of refraction of the electrooptical material across a first dimension thereof to provide for a first predetermined index of refraction profile along the first dimension and thereby form a lens, and whereby the change in index of refraction across the first dimension is adapted to change the angle at which the optical beam entering the electrooptic lens exits the lens; and a first voltage source coupled to the first plurality of electrodes and the at least one ground electrode for applying predetermined voltages to the plurality of electrodes to create the first predetermined index of refraction profile in the electrooptic material.

2. The lens system of claim 1 wherein the electrooptic material comprises barium titanate ($BaTiO_3$).

3. The lens system of claim 1 wherein the electrooptic material comprises lithium niobate ($LiNbO_3$).

4. The lens system of claim 1 wherein the first plurality of electrodes comprises a plurality of parallel electrodes disposed across the first surface of the electrooptic material.

5. The lens system of claim 1 wherein the first plurality of electrodes comprises a grid of electrodes disposed on the first surface of the electrooptic material in a checkerboard pattern.

6. The lens system of claim 2 wherein the first plurality of electrodes comprises a plurality of parallel electrodes disposed across the first surface of the electrooptic material.

7. The lens system of claim 2 wherein the first plurality of electrodes comprises a grid of electrodes disposed on the first surface of the electrooptic material in a checkerboard pattern.

8. The lens system of claim 3 wherein the first plurality of electrodes comprises a plurality of parallel electrodes disposed across the first surface of the electrooptic material.

9. The lens system of claim 3 wherein the first plurality of electrodes comprises a parallel grid of electrodes disposed on the first surface of the electrooptic material in a checkerboard pattern.

10. The lens system of claim 1 wherein the first voltage source is adapted to provide electric fields in the range of 0 kV/centimeter to 100 kV/centimeter.

11. The lens system of claim 1 wherein the first plurality of electrodes comprises a plurality of spaced apart parallel electrodes disposed on the first surface of the electrooptic material, and wherein the lens system further comprises a second plurality of electrodes comprising a plurality of spaced apart parallel electrodes disposed on the first plurality of electrodes and oriented orthogonal thereto and which are substantially transparent to the optical beam, and a second voltage source coupled to the second plurality of electrodes and the at least one ground electrode for applying predetermined voltages to the second plurality of electrodes to create a second predetermined index of refraction profile in the electrooptic material.

12. An adaptive optical lens system comprising:

an electrooptic material having first and second surfaces that are disposed normal to the direction of propagation of an optical beam through the adaptive optical lens system and having an index of refraction that is adjustable in response to an applied electric field;

a first plurality of electrodes disposed on the first surface of the electrooptic material and at least one ground electrode disposed on the second surface of the electrooptic material that are adapted to apply electric fields thereto, which electric fields are adapted to selectively change the index of refraction of the electrooptical material across a first dimension thereof to provide for a first predetermined index of refraction profile along the first dimension and thereby form a lens, and whereby the change in index of refraction across the first dimension is adapted to change the angle at which an optical beam entering the electrooptic lens exits the lens;

a second plurality of electrodes comprising a plurality of spaced apart parallel electrodes disposed on the first plurality of electrodes and oriented orthogonal thereto, which electric fields are adapted to selectively change the index of refraction of the electrooptical material across a second dimension thereof to provide for a second predetermined index of refraction profile along the second dimension, and whereby the change in index of refraction across the second dimension is adapted to change the angle at which an optical beam entering the electrooptic lens exits the lens;

a first voltage source coupled to the first plurality of electrodes and the at least one ground electrode for applying predetermined voltages to the first plurality of electrodes to create the first predetermined index of refraction profile in the electrooptic material; and a second voltage source coupled to the second plurality of electrodes and the at least one ground electrode for applying predetermined voltages to the second plurality of electrodes to create the second predetermined index of refraction profile in the electrooptic material.

13. The lens system of claim 12 wherein the electrooptic material comprises barium titanate ($BaTiO_3$).

14. The lens system of claim 12 wherein the electrooptic material comprises lithium niobate ($LiNbO_3$).

15. The lens system of claim 12 wherein the first and second voltage sources are adapted to provide electric fields in the range of 0 kV/centimeter to 100 kV/centimeter, respectively, to the first and second pluralities of positive electrodes.

16. The lens system of claim 12 wherein the first and second pluralities of electrodes and the at least one ground electrode are substantially transparent to the optical beam.

17. The lens system of claim 16 wherein the first and second pluralities of electrodes and the at least one ground electrode are disposed normal to the direction of propagation of an optical beam.

* * * * *